March 14, 1950  S. BERGSTEIN  2,500,338
MANUFACTURE OF TRANSPARENT KNOCKDOWN CONTAINERS
Filed Aug. 4, 1947  4 Sheets-Sheet 1
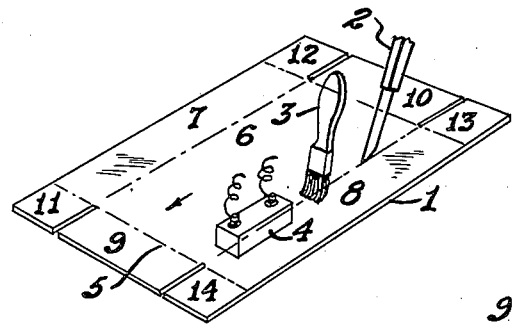
FIG.1.
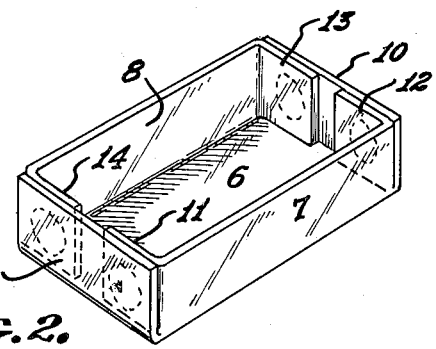
FIG.2.
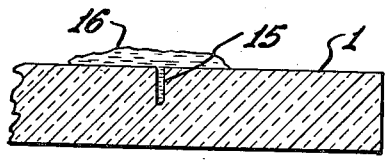
FIG.3.
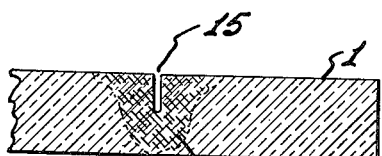
FIG.4.
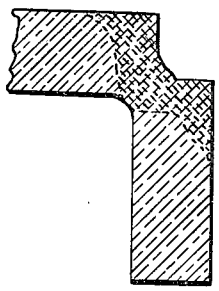
FIG.5.
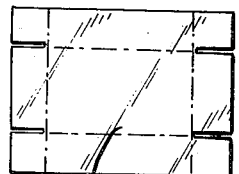
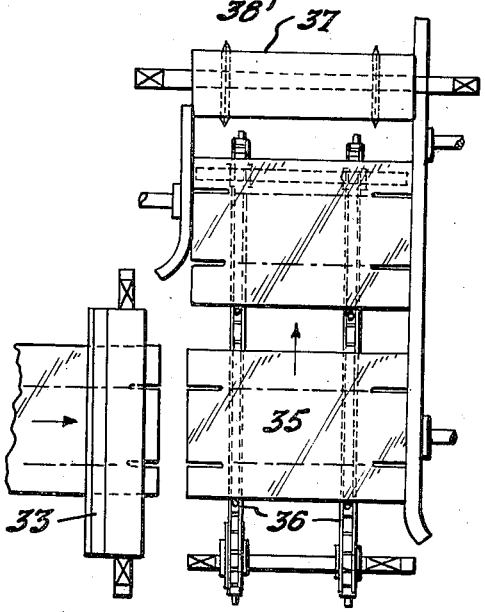
FIG.8.
INVENTOR.
SAMUEL BERGSTEIN.
BY Allen & Allen
ATTORNEYS.

March 14, 1950   S. BERGSTEIN   2,500,338
MANUFACTURE OF TRANSPARENT KNOCKDOWN CONTAINERS
Filed Aug. 4, 1947   4 Sheets-Sheet 2
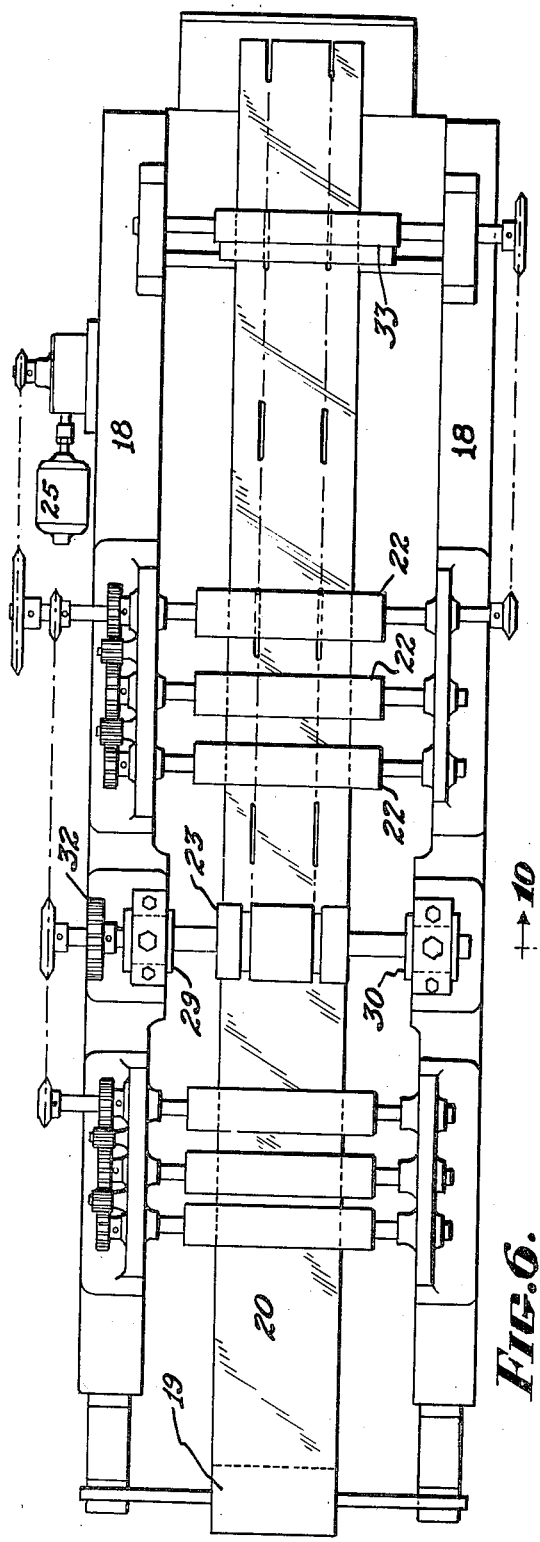
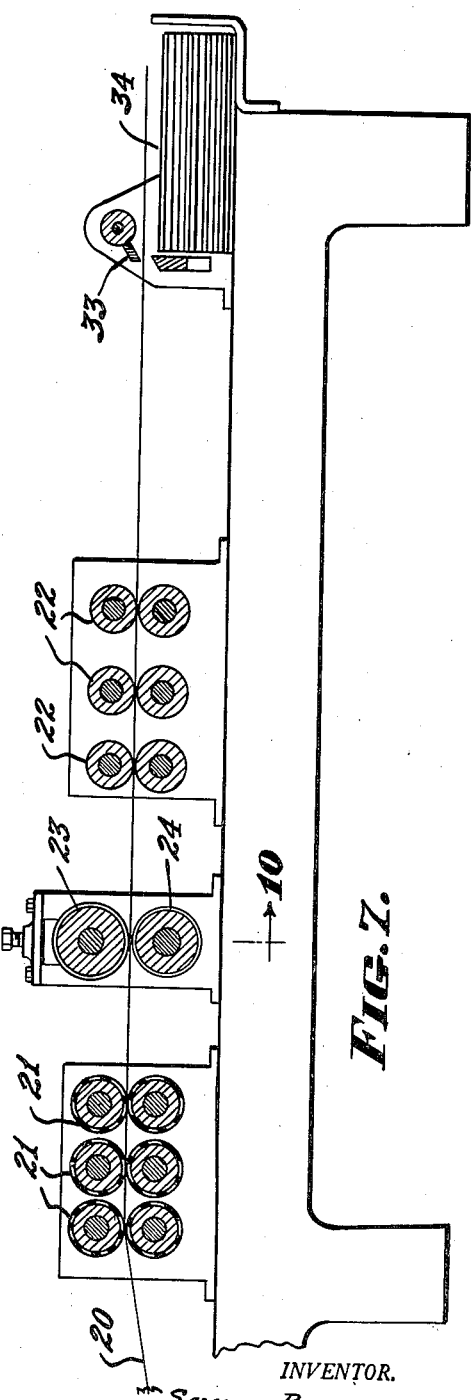
INVENTOR.
SAMUEL BERGSTEIN.
BY Allen & Allen
ATTORNEYS.

March 14, 1950 S. BERGSTEIN 2,500,338
MANUFACTURE OF TRANSPARENT KNOCKDOWN CONTAINERS
Filed Aug. 4, 1947 4 Sheets-Sheet 3
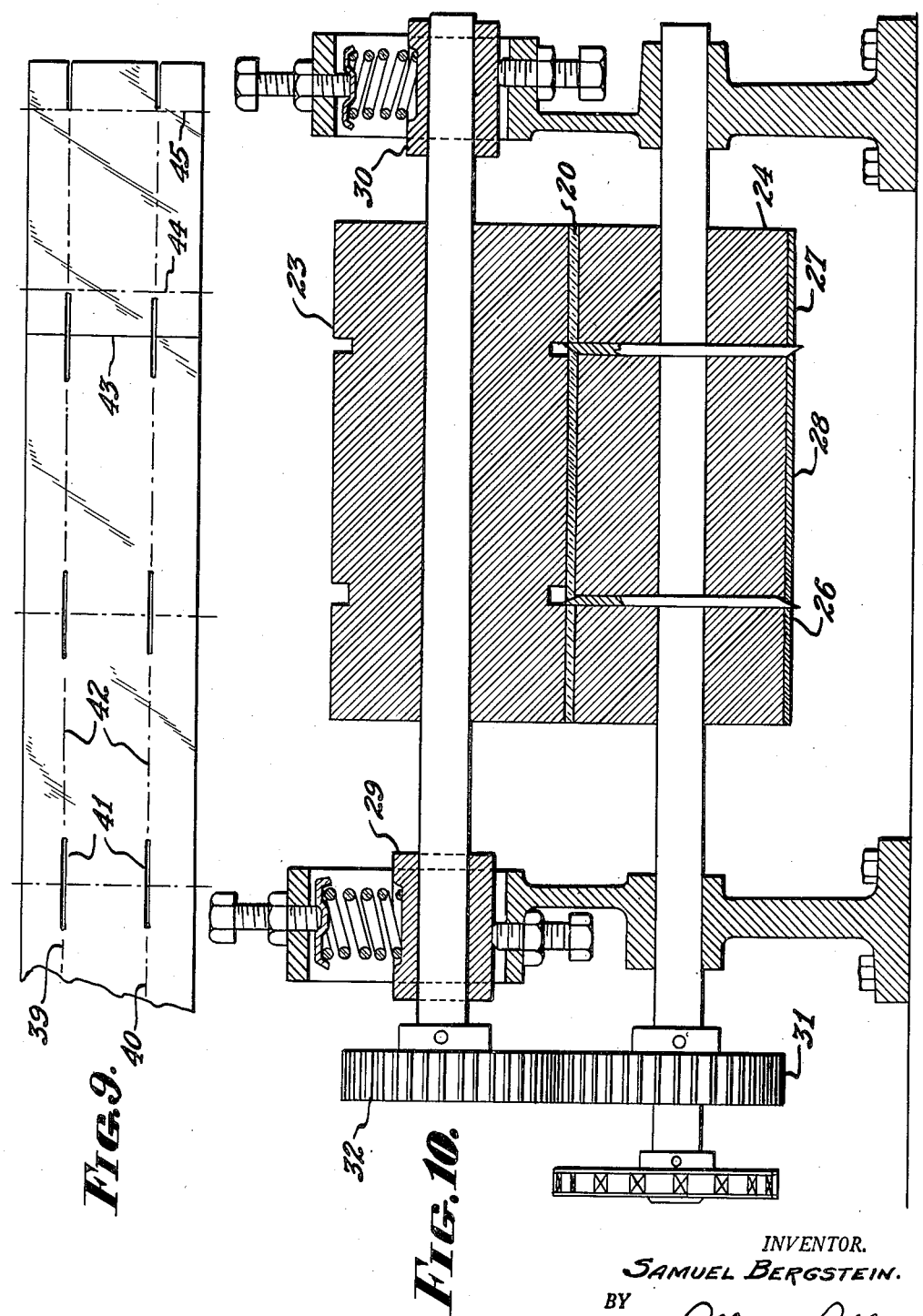
INVENTOR.
SAMUEL BERGSTEIN.
BY Allen & Allen
ATTORNEYS.

March 14, 1950 S. BERGSTEIN 2,500,338
MANUFACTURE OF TRANSPARENT KNOCKDOWN CONTAINERS
Filed Aug. 4, 1947 4 Sheets-Sheet 4
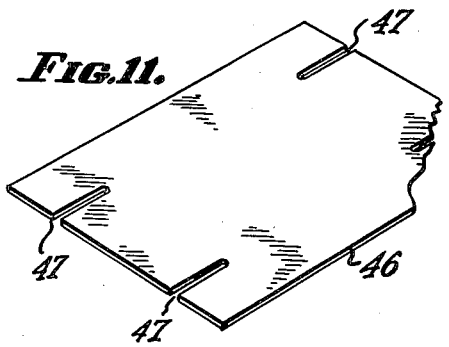
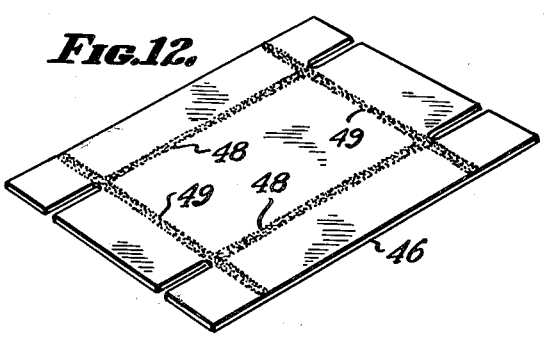
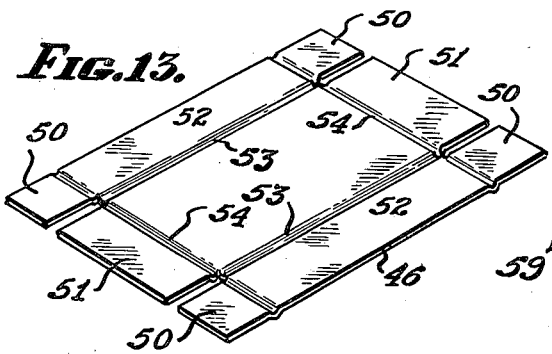
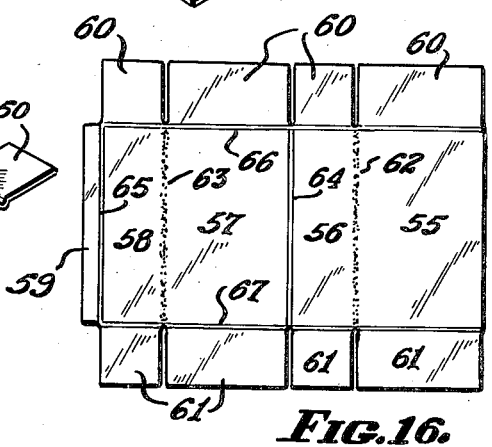
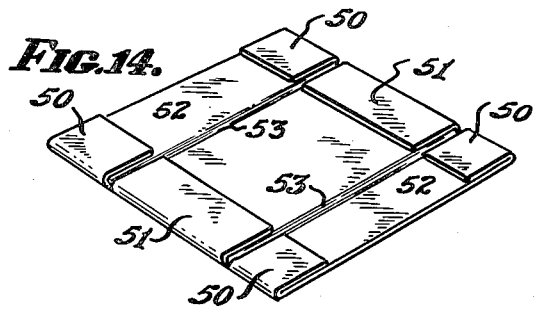
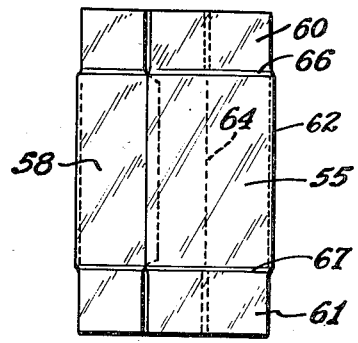
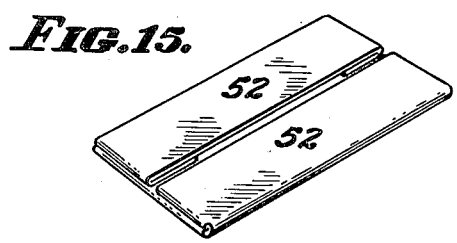
INVENTOR.
SAMUEL BERGSTEIN.
BY
Allen & Allen
ATTORNEYS.

Patented Mar. 14, 1950

2,500,338

UNITED STATES PATENT OFFICE 2,500,338

MANUFACTURE OF TRANSPARENT KNOCKDOWN CONTAINERS

Samuel Bergstein, Cincinnati, Ohio

Application August 4, 1947, Serial No. 765,851

9 Claims. (Cl. 18—56)

My invention relates to the provision of containers made from thermoplastic sheeting. There are many kinds of thermoplastic sheeting available on the market, of which cellulose acetate will serve as a non-limiting example. These sheeting substances have substantial rigidity, and being transparent or colored, they are well adapted for the manufacture of containers which serve not only to protect the contents, but to display them so attractively as to provide a distinct aid in merchandising. It is characteristic of these sheeting substances, however, that they cannot be weakened along a predetermined line by scoring and made to be bendable along that line, as can boxboard. They may be bent or formed upon heating; but when cooled remain rigidly in the bent form. As a consequence the greater part of the commercial development in containers made from such plastic sheetings has been in the manufacture of set-up cartons and containers. These have been expensive to ship and store, and the cost of such containers has thus far been high. If an attempt is made to make the containers at the point of use, the box user must procure relatively elaborate and expensive mechanism.

The principal object of my invention has to do with methods of treating sheeting materials to render them bendable along predetermined lines, and with structures of treated sheeting which may be formed into containers either with no mechanism at all in the hands of the box user, or with the aid of a simple block or form about which the parts of the structures may be bent and held as they are being adhesively secured together.

Hence, one of the objects of my invention is to provide a method of treating sheeting and a treated sheeting having parts articulated together along predetermined hinge lines.

It is an object of my invention to provide articulation in sheeting structures without the use of hinging strips or sheets.

It is an object of my invention to provide knock down structures formed entirely of sheeting and having parts articulated together along hinge lines extending in a plurality of directions.

These and other objects of my invention which will be set forth hereinafter or will be apparent to one skilled in the art upon reading these specifications, I accomplish in those procedures and in those structures and arrangements of parts of which I shall now describe certain exemplary embodiments. Reference is made to the accompanying drawings wherein:

Figure 1 is a diagrammatic view illustrating operations which may be applied to sheeting in carrying on my process.

Figure 2 is a perspective view of one type of box or container structure which may be made from an article treated by the steps diagrammatically illustrated in Figure 1.

Figures 3 and 4 are partial sectional views of a piece of sheeting showing different stages in the treatment thereof in accordance with my invention.

Figure 5 is a partial sectional view showing a piece of sheeting, after being treated as illustrated in Figures 3 and 4, in the bent condition.

Figures 6 and 7 are respectively plan and elevational views of diagrammatic character of a machine which may be employed in the treatment of sheeting materials in accordance with my invention.

Figure 8 is a diagrammatic plan view of an angularly related portion of the machine of Figures 6 and 7.

Figure 9 is a plan view of a series of blanks for the form of container illustrated in Figure 2, and is diagrammatically illustrative of a sequence of steps which may be used in forming such blanks.

Figure 10 is a partial sectional view taken along the line 10—10 of Figure 7.

Figure 11 is a plan view of a piece of sheeting slotted for carton formation.

Figure 12 is a perspective view of the same piece in which lines for articulation have been treated to make them bendable.

Figure 13 is a similar view in which the treated lines have been scored by displacement.

Figures 14 and 15 are perspective views showing stages in the manufacture of an infolded carton.

Figure 16 is a plan view of a blank for a tubular carton with lines for articulation treated therein.

Figure 17 is a plan view of the blank of Figure 16 in tubed condition.

While suggestions have hitherto been made in the art looking toward the formation of collapsible or knock down structures made in part at least from discrete panels of sheeting which were hinged together by means of relatively thin flexible film, there has not hitherto been developed any method of treating the sheeting itself to give it the property of bending a plurality of times along predetermined folding or hinge lines. As indicated above, it is not possible to treat the sheeting as boxboard has been treated, and form lines of articulation in it by scoring. If an attempt is made to "cut-score" a plastic sheeting, as has been practiced in some instances with boxboard, it will be noted that while the sheeting can be weakened along the line of partial cut formed therein, so that bending forces applied to it will cause it to bend sharply along that line, no commercially satisfactory hinging is achieved. The sheeting, along the weakened line, is very brittle. It will frequently break in two upon the first bending, but in any event it will break upon a subsequent bending, so that the joint cannot be regarded as a commercial articulation. Moreover, the cut material can only be bent in one direction.

By repeated and lengthy experimentation, however, I have found that commercially satisfactory lines of articulation may be achieved in structures formed of sheeting by the methods and steps hereinafter set forth. This enables me to manufacture articulated structures which consist of the sheeting alone in all of their parts. The lines of articulation may be formed in the sheeting in any desired direction, and in a single piece of sheeting, in any desired plurality of directions. As a consequence, I am enabled to form from sheeting alone articulated structures which, in their ability to be bent along predetermined hinge lines, are the equivalent of the hitherto known carton and container blanks made from boxboard. By the same token, I am not restricted to the manufacture of any particular kind or style of carton or container, my teaching being applicable to the manufacture of blanks from sheeting, in any of the styles hitherto known for cartons and containers made of boxboard. For the purpose of making an illustrative showing herein, I shall describe my invention in connection with the manufacture of a tubular carton and of a simple tray-like structure which either may be used as such, or may be regarded as one element of a two-piece box.

Briefly, in the practice of my invention, I treat the plastic sheeting so as to make it bendable along the predetermined line of articulation. This may be accomplished, in one aspect of my invention, by cutting part way through its thickness, by making the product thinner as by grinding it along a predetermined line, or operating upon it with a milling cutter so as to remove a portion of its thickness, or even by treating it under pressure or a combination of heat and pressure so as to displace a portion of the plastic and reduce the thickness of the sheeting along a predetermined line. As indicated above, this step alone is not sufficient to provide a commercial line of articulation, because the remaining thickness of the sheeting is brittle. I have found that the difficulty may be obviated by treating the plastic sheeting along the predetermined line with a plasticizer for the sheeting. This plasticizer is preferably applied in solution in a solvent for the substance of the plastic sheeting itself. The solvent assists in the rapid penetration of the plasticizer throughout the thickness of the sheeting, not only in the thinner area along the line of weakening, but also in closely adjacent parts of the unreduced sheeting. The application of heat may also be employed to assist in the penetration of the plasticizer, and will be found to be effective in increasing the rapidity of the removal of the solvent after it has done its work. Where speed of penetration in a manufacturing operation is not of importance, a liquid plasticizer may be applied without solvent. Where speed in the elimination of solvent is not important, the application of heat may be omitted. Heat will, however, assist in the penetration of a plasticizer applied without solvent.

The application of the plasticizer will be confined substantially to the desired line or lines of articulation in the plastic sheeting. The plasticizer, or combination of plasticizer and solvent, may be applied to either or both sides of the sheeting. I ordinarily apply it at least to that side of the sheeting which has been weakened or rendered thinner along a predetermined line, as described above, and preferably just after the sheeting has been made thinner in any of the ways described, since I find that the plasticizer will penetrate more readily at the thinner portion of the sheeting. It is not, however, beyond the scope of my invention, to apply the plasticizer before the sheet has been rendered thinner as by cutting.

In another aspect of my invention, I have found that the sheeting may be rendered bendable and that definite lines of articulation may be imparted to the sheeting by merely treating it with a plasticizer or solution of plasticizer along predetermined lines, carefully controlled as to width, and without reducing the thickness of the sheeting along these lines. With most thermoplastic sheeting substances, I have been able to secure successful results in this way in thicknesses of .02 inch or greater. The sheeting may then be bent on the bendable lines during the manufacturing process, or the bendable lines otherwise defined as hereinafter taught.

Excepting as they may be comprised within a unitary manufacturing program, there is no necessary time relationship between the step of rendering the sheeting thinner along a predetermined line, and the step of applying the plasticizer. For example, it is within the purview of my invention to manufacture carton or container blanks from sheeting by cutting the sheeting where required and by rendering the sheeting thinner along predetermined lines of articulation in the blanks, without other treatment, the blanks may then be shipped to the ultimate user, who as an incident of the formation of erected cartons or containers from the blanks, will treat the lines of articulation therein with plasticizer or with solvent and plasticizer as will readily be understood from the ensuing teachings.

Nevertheless, by following the practices set forth herein, I have been enabled to manufacture knock down cartons or containers of thermoplastic sheetings, which have preformed lines of articulation in them, retaining the ability to bend without cracking for long periods of time.

Figure 1 is diagrammatically representative of steps which have been discussed above. A sheeting element 1, which may be thought of as moving in the direction of the arrow, is first treated by a device such as a cutting means which will render it thinner along a desired line of articulation. This is diagrammatically represented by a knife 2. The application of the plasticizer or combination of plasticizer and solvent is symbolized by a brush 3. The device 4 is diagrammatically representative of the application of heat, which may be done if desired. The shaded transverse area 5 may be thought of as a fully treated line of articulation.

The sheet of plastic material is shown as being divided, by lines of cut and lines of articulation, into a main panel 6, side walls 7 and 8, end walls 9 and 10 and attachment flaps 11, 12, 13, and 14. The form of this structure will be recognized as that of a simple tray or similar box element, such as is illustrated in Figure 2, where in erecting the structure the side and end walls are bent upwardly at right angles to the main panel 6, the attachment flaps 11, 12, 13 and 14 are bent inwardly inside the end walls, and where the attachment flaps may be secured to the end walls in any suitable way. When the sheeting has properly been treated to form lines of articulation in it, this bending may be done either by hand or mechanism, and with or without the aid of a simple forming device. The attachment flaps may be configured to interlock with the end walls in ways known to the carton manufacturer, or the tray like structure may be held in the erected condition by cementing the attachment flaps to the end walls with any suitable adhesive or with a solvent which will soften these parts and cause them to weld together. Figure 3 diagrammatically illustrates a portion of the sheeting 1, the cutting or other thinning operation serving to reduce its thickness as at 15. A plasticizer or combination of plasticizer and solvent as initially applied is indicated at 16. In Figure 4 it will be noted that the plasticizer has penetrated the sheeting in an area closely surrounding the partial cut 15, as at 17. Figure 5 shows the sheeting bent along the line of articulation in a direction away from the partial cut. In the way described above I secure a commercially satisfactory hinging action with the material in a non-brittle condition along the hinge line. In the practice of my invention, after the sheeting has properly been treated, it is readily possible to bend it in the opposite direction, i. e. toward the line of cut in it, and although some portions of the sheeting may be subjected to a stretching action in such bending, these portions will have been plasticized and will stretch as required without breaking.

There are many ways in which the steps outlined above can be performed. It is within the scope of my invention to employ, for rendering the sheeting thinner along predetermined lines, as well as for cutting blanks from sheeting, cutting and scoring presses and dies such as have been used for boxboard, where knife members are set in the dies in such away as to cut partially through the sheeting along the desired lines of articulation. It is difficult, however, to maintain such accuracy as respects the cutting rules and make ready in a cutting and scoring press as to insure that the sheeting along the predetermined lines is always cut exactly to the required depth.

A desired partial and complete cutting of the sheeting substance is more advantageously accomplished through the use of continuously acting mechanism operating initially upon a continuous length of the sheeting substance. Rotary die elements may be employed adapted to cut and score the sheeting in a plurality of directions continuously and in a single operation; but again I prefer for simplicity to provide rotary cutting devices operating longitudinally upon a continuous web of the sheeting substance, followed by an operation in which the web is cut into individual lengths, and concluding with an operation in which these individual lengths are treated transversely, as will hereinafter be set forth.

Referring to Figures 6 and 7, I have shown diagrammatically therein the first section of a machine of the mentioned type. This machine has side frame members 18, and at one end means for supporting a roll 19 of the sheeting. A web of sheeting 20, withdrawn from this roll, is passed through two series of driven pinch rolls indicated at 21 and 22 so as to feed the material along in a positive and smooth fashion. Between the two sets of feed or pinch rolls, I locate a cutting means having driven elements 23 and 24. These elements are driven in synchronism with the feed rolls by suitable gearing and drives from a prime mover such as the motor 25 in Figure 6.

As shown in the sectional view, Figure 10, the upper driven element 23 is an anvil roll or means against which knives associated with the member 24 can cut the sheeting 20. The lower driven member 24 is in the form of roller-like elements mounted upon a shaft and carrying between them cutting knives, which are indicated at 26 and 27. The sheeting is shown passing between the driven elements 23 and 24 as at 20.

The spacing and size of the driven elements 23 and 24 is such that when they come together against the faces of the sheeting 20, the knives 26 and 27 will cut entirely through the sheeting. The apparatus may be made to cut partially through the sheeting in certain areas by the simple expedient of affixing to portions of the surfaces of the roll-like elements making up the driven member 24, pads or sheets of material 28 which, coming into the bite between the driven elements 23 and 24, serve to separate them. The upper driven element 23 will, of course, be mounted in resilient bearing elements 29 and 30 which will permit a separation of elements 23 and 24 without interrupting the meshing of the gear elements 31 and 32 by which the elements 23 and 24 are driven in synchronism.

It will be understood that the specific construction shown in Figure 10 may be modified, and in particular that by changing the roll-like members going to make up the rotary element 24, various numbers of knives may be incorporated in the lower element.

It will be understood that when a continuous web of sheeting 20 is run between elements 23 and 24, this web will be treated along longitudinal lines, the treated lines consisting in part of cuts passing entirely through the sheeting, and in part of cuts passing only partially through the sheeting in a controlled fashion.

Referring again to Figures 6 and 7, it will be seen that I provide a driven fly knife 33 or its equivalent for severing the web of sheeting into individual pieces of the desired length of the box blanks. These pieces may either be stacked as diagrammatically indicated at 34 in Figure 7, or by means of a suitable transfer mechanism as well known in the art, they may be passed individually to a second, and angularly related, portion of the machine such as that illustrated in Figure 8. Here the individual blank pieces 35 may be moved transversely, as by a conveyor 36, and, positioned by suitable side guides, may be passed between cutting mechanism 37 which, in essence, will be the same as that illustrated in Figure 10. This cutting mechanism will act to treat the blanks transversely by cutting partway through the material of the sheeting, so as to form transverse lines of weakening for articulation therein. A finished blank as so formed is illustrated at 38 in this figure.

The sequence of operations in treating a continuous web of sheeting to form the simple tray-blanks such as have been described above, is illustrated in Figure 9. Here the web of sheeting is first treated longitudinally along lines 39 and 40. At certain places in the length of these lines the sheeting material is cut entirely through as at 41. The purpose of this cutting is to separate the glue flaps 11, 12, 13 and 14 from the respective end walls of the blanks; and the length of the full cut lines 41 is made to be at least double the depth of the end walls of the blank. Other portions of the lines 39 and 40, as at 42, are characterized by a partial cutting of the substance of the sheeting so as to form the lines of articulation joining the side walls of the tray-blank to the main panel thereof.

After the formation of these lines, the web is severed into individual blanks by lines of cut 43 substantially bisecting the full cut lines 41. Finally, the individual sheeting pieces are treated transversely for the formation of lines 44 and 45 along which the sheeting substance is cut only partially through.

If it is desired that the plasticizer, or combination of plasticizer and solvent, be applied on the machine at the time of the making of the lines of weakening, this may readily be accomplished by mounting on the machine in appropriate places fountain-type applicators of known character. Likewise, if the application of heat is desired, electric, radiant or other heaters may be mounted upon the machine in convenient locations.

While I have described the action of an exemplary machine in making the simple blank for a tray-like box, it will be understood that by multiplying knives and properly spacing them, blanks of any desired kind may be made by similar operations. These blanks may have any desired number of longitudinal or transverse lines of weakening, including lines of full cut in these directions. If lines of weakening or cut are desired in other directions, the rotary element 24, or its counterpart in the assembly 37, may be provided with knives which follow other directions than the truly circumferential. Likewise, if the blanks are to have irregular outlines, I may use a means of severing the web into individual sheets other than a fly knife which makes a simple, linear, transverse cut; and I may also so configure my knives on my cutting instrumentalities as to sever portions from the web at its edges or intermediate its edges, all as will be understood by the skilled worker in the art in the light of the teachings herein.

Box blanks such as that illustrated at 38 in Figure 8, or other forms of box blank made in the accordance with my teachings, may as indicated above be shipped to the user without plasticization along the lines of articulation; and the user may himself employ the plasticizer by applying it along the weakened lines. Where the box blanks are shipped to the user in the unplasticized form, and are immediately to be set up by the user, as for example around a form, it may in many instances be found sufficient simply to treat the weakened lines with a solvent for the substance of the sheeting so as to soften the sheeting and permit the bend to be made, so long as the bending is done while the substance is sufficiently softened, i. e. before the solvent fully evaporates. For most uses, however, a resident plasticity in the substance of the sheeting is desired along the weakened lines which form the lines of articulation, so that the sheeting may be bent back and forth a large number of times along the weakened lines. As I have already indicated, this may be accomplished by treating the sheeting along the weakened lines with the plasticizer, with or without a solvent.

I have also found that it is of assistance to practice an actual bending of the sheeting along the hinge lines as soon as the sheeting is sufficiently plasticized. This may be accomplished either by hand or mechanically. By way of example, if the blank 38 as formed on the machines of Figures 6, 7 and 8 has been treated so as to be plasticized along the hinge lines I may next run the blank through a conventional score breaker. What I mean by this is a carton folding machine which has folding elements so arranged as to bend the articulated elements of the carton inwardly along the hinge lines and reversely bend them to their original position. It will also be readily understood that while I may ship the cartons in blank form, where they are of the simple type shown at 38 in Figure 8, I may also ship carton blanks with various panels, or even with all panels in folded condition. Also in the case of carton types requiring gluing in the knock down form, as for example cartons having tubular, collapsible bodies, or cartons of the well known infold or outfold types, I may, after the plasticization of the required number of weakened lines, or all of them, fold the cartons to the required final collapsed form, accompanied by the adhesive union of any parts requiring it.

As indicated above, I have also found that I can form satisfactory lines of articulation in sheeting by simply treating the sheeting along predetermined lines with solvent and plasticizer, and without making incisions in it.

In accomplishing this I apply a line of solvent and plasticizer preferably to both sides of the sheeting. This may be done on a carton folding and gluing machine, if desired, equipped with fountain-type applicators. To accelerate the action of the plasticizer in penetrating into the sheeting I apply heat of sufficient temperature to cause the coated line to be dry when it reaches the folding mechanism. The lines of fold can be satisfactorily defined by restricting the application of solvent and plasticizer to narrow lines.

To achieve high speed production it may be found advisable to repeat the application of solvent and pasticizer, and in instances, the bending. This can be accomplished by making the mechanism longer and providing a plurality of applicators and bending means. Heat may be applied in ways obvious to the skilled worker in the art.

After the sheeting has been folded on the softened line, it can either be left folded, or it can be unfolded again; and the carton structures can be shipped to the user either infolded, or partially folded, or flat as desired.

In Figure 11, I have shown a piece 46 of sheeting slotted as at 47 to form the lines of separation between glue flaps. In Figure 12, I have indicated at 48 and 49 longitudinal and transverse lines for articulation, treated in the way set forth above. The sheeting is now softened along these lines and the lines may be thought of as narrow enough to define lines of fold. In Figures 14 and 15, I have indicated the formation of a knocked down structure which may be shipped to the user. The first step in forming this structure would be the infolding of the end walls and glue flaps as at 50 and 51. This may be accomplished by passing the blank of Figure 12 through an ordinary carton folding machine. In Figure 15, the side walls have been infolded as at 52. The folding has two effects: it defines the folds along the machine-made lines and it assists in the softening of the sheeting. The lines of fold remain in the softened condition, and the structure in Figure 15 is easily erected by the user.

In instances where the structures cannot conveniently be shipped in folded condition, it is within the scope of my invention to define lines of fold in the sheeting (which lines coincide with lines previously treated with the solvent and plasticizer) by forming displacement scores along these lines as indicated at 53 and 54 in Figure 13.

My procedure is applicable to the making of tubular cartons by way of a further example. In Figure 16, I have shown a carton blank with body walls 55, 56, 57, and 58 and a glue flap 59 in articulation in the order named. Closure flaps 60 and 61 are articulated to the ends of the body walls. The lines of articulation will be treated in the ways set forth above. In tubing the structure as in Figure 17, the blank may be bent upon lines of articulation indicated at 62 and 63 with the concurrent attachment of the glue flap 59 to the free edge of the body wall 55. Since the carton will not be folded on other lines of articulation, these may, if desired, be defined by displacement scores as at 64, 65, 66, and 67.

As to the substance of the sheeting, this may be any thermoplastic material capable of being formed into relatively thin but relatively stiff sheets suitable for box making, incapable of being weakened by scoring, non-fibrous in character, capable of being plasticized by the absorption of a plasticizer, and preferably capable of being softened by a solvent. As to the substance of the plasticizer, this may be any known plasticizer for the substance of the sheeting, and may be chosen from the lists of known plasticizers, published in connection with known plastics. By way of a single example, with acetate sheeting I may employ a solution of di-allyl phthalate in acetone. The plasticizer should be one capable of being absorbed by the plastic when the plastic is in sheet form, and it is preferably one which is soluble in a solvent for the plasticizer with which it is to be used.

Modifications may be made in my invention without departing from the spirit of it. Having thus described my invention in an exemplary embodiment, what I claim as new and desire to secure by Letters Patent is:

1. A process of forming lines of hinged articulation in plastic sheeting incapable of being hingedly articulated by scoring alone, which comprises applying to said sheeting a plasticizer along a line of desired bending therein, permitting said plasticizer to penetrate said sheeting, and defining a line of bending coincident with said first-mentioned line by forming in said sheeting a displacement score in the area softened by said plasticizer.

2. A carton structure formed of plastic sheeting which is incapable of being hingedly articulated by scoring alone, said structure comprising a plurality of panel parts hingedly articulated together, certain of said panel parts being folded with respect to others to form a knock-down carton structure, said lines of fold being softened with respect to the body of said sheeting by an excess content of plasticizer.

3. A process of forming lines of hinged articulation in plastic sheeting incapable of being hingedly articulated by scoring alone, said process comprising defining a line of articulation in said plastic by making it thinner along said line, and then softening said plastic along said line sufficiently to permit said plastic to bend along said line without cracking, said plastic being softened by the step of applying to it a plasticizer in an area closely conforming to said line.

4. A process of forming lines of hinged articulation in plastic sheeting incapable of being hingedly articulated by scoring alone, said process comprising defining a line of articulation in said plastic by making it thinner along said line, and then softening said plastic along said line sufficiently to permit said plastic to bend along said line without cracking, said plastic being softened by the step of applying to it a plasticizer in an area closely conforming to said line, said plasticizer being dissolved in a solvent which is also a solvent for said plastic.

5. A process of forming lines of hinged articulation in plastic sheeting incapable of being hingedly articulated by scoring alone, said process comprising defining a line of articulation in said plastic by making it thinner along said line, and then softening said plastic along said line sufficiently to permit said plastic to bend along said line without cracking, said plastic being softened by the step of applying to it a plasticizer in an area closely conforming to said line, said plasticizer being dissolved in a solvent which is also a solvent for said plastic, said mixture of plasticizer and solvent being applied to said plastic after the formation of said thinner line therein and at least to the side from which the thickness of said plastic has been reduced.

6. A process of forming lines of hinged articulation in plastic sheeting incapable of being hingedly articulated by scoring alone, said process comprising defining a line of articulation in said plastic by making it thinner along said line, and then softening said plastic along said line sufficiently to permit said plastic to bend along said line without cracking, said plastic being softened by the step of applying to it a plasticizer in an area closely conforming to said line, said plasticizer being dissolved in a solvent which is also a solvent for said plastic, said mixture of plasticizer and solvent being applied to said plastic after the formation of said thinner line therein and at least to the side from which the thickness of said plastic has been reduced and further applying heat to said line so as to assist in the penetration of said plasticizer and the elimination of said solvent by evaporation.

7. A carton structure formed of plastic sheeting which is incapable of being hingedly articulated by scoring alone, said structure comprising a plurality of panel parts hingedly articulated together, certain of said panel parts being folded with respect to others to form a knock down carton structure, said sheeting being thinner along the lines of fold, said lines of fold being softened with respect to the body of said sheeting by an excess content of plasticizer.

8. In a carton blank formed of plastic sheeting which is incapable of being hingedly articulated by scoring alone, a plurality of panel parts defined by lines of hinged articulation, said sheeting being thinner along said lines of hinged articulation, said lines of hinged articulation being softened with respect to the body of said sheeting by a plasticizer.

9. In a knock-down carton blank formed of plastic sheeting which is incapable of being hingedly articulated by scoring alone, a plurality of panel parts defined by lines of hinged articulation, said lines of hinged articulation being softened with respect to the body of said sheeting by a plasticizer applied in areas closely conforming to said lines of hinged articulation, said lines of hinged articulation being angularly related.

SAMUEL BERGSTEIN.

REFERENCES CITED

The following references are of record in the file of this patent:

UNITED STATES PATENTS

| Number | Name | Date |
|---|---|---|
| 1,431,476 | MacInnes | Oct. 10, 1922 |
| 1,872,482 | Messing | Aug. 16, 1932 |
| 1,992,087 | Miller et al. | Feb. 19, 1935 |
| 2,120,826 | Young | June 14, 1938 |
| 2,157,794 | MacDonald et al. | May 9, 1939 |
| 2,159,926 | Berliner | May 23, 1939 |
| 2,388,397 | Emmer | Nov. 6, 1945 |